United States Patent
Lew et al.

(10) Patent No.: US 10,737,946 B1
(45) Date of Patent: Aug. 11, 2020

(54) SYNTHESIS OF ALUMINUM-CONTAINING MOLECULAR SIEVES OF SEW FRAMEWORK TYPE

(71) Applicant: Chevron U.S.A. Inc., San Ramon, CA (US)

(72) Inventors: Christopher Michael Lew, Alameda, CA (US); Kurt Owen Jensen, Richmond, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 16/554,697

(22) Filed: Aug. 29, 2019

(51) Int. Cl.
*C01B 39/48* (2006.01)
*C01B 39/02* (2006.01)
*B01J 20/18* (2006.01)
*B01J 29/70* (2006.01)

(52) U.S. Cl.
CPC ............ *C01B 39/48* (2013.01); *C01B 39/026* (2013.01); *B01J 20/18* (2013.01); *B01J 29/70* (2013.01)

(58) Field of Classification Search
CPC ........ C01B 39/026; C01B 39/48; B01J 29/70; B01J 20/18
See application file for complete search history.

(56) References Cited

U.S. PATENT DOCUMENTS

| 7,022,308 B1 * | 4/2006 | Yuen ..................... C01B 39/12 423/706 |
| 7,820,141 B2 * | 10/2010 | Burton, Jr. ............ C01B 37/007 423/704 |
| 2009/0060813 A1 * | 3/2009 | Burton .................. C01B 37/007 423/277 |

FOREIGN PATENT DOCUMENTS

| WO | 2010059297 A2 | 5/2010 | |
| WO | WO-2010059297 A2 * | 5/2010 | ............. B01J 29/86 |
| WO | WO-2014099043 A1 * | 6/2014 | ............. C10G 45/64 |

OTHER PUBLICATIONS

D. Xie, L.B. McCusker and C. Baerlocher "Structure of the Borosilicate Zeolite Catalyst SSZ-82 Solved Using 2D-XPD Charge Flipping" J. Am. Chem. Soc. 2011, 133, 20604-20610.

S.I. Zones, A. Benin, S-J. Hwang, D. Xie, S. Elomari and M-F. Hsieh "Studies of Aluminum Reinsertion into Borosilicate Zeolites with Intersecting Channels of 10- and 12-Ring Channel Systems" J. Am. Chem. Soc. 2014, 136, 1462-1471.

* cited by examiner

*Primary Examiner* — David M Brunsman

(57) ABSTRACT

A method is provided for directly synthesizing aluminum-containing molecular sieves of SEW framework type by interzeolite transformation.

9 Claims, 1 Drawing Sheet

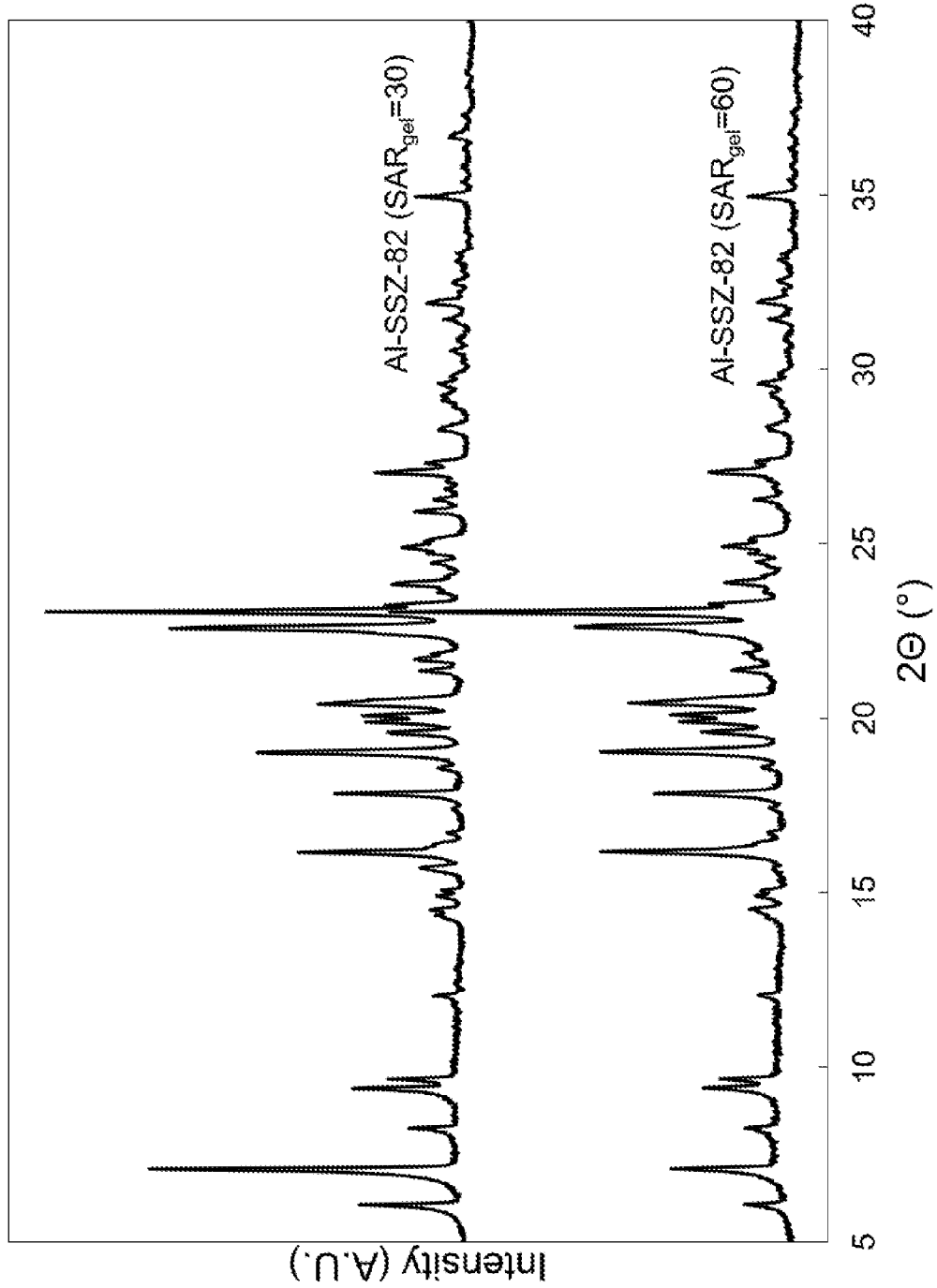

SYNTHESIS OF ALUMINUM-CONTAINING MOLECULAR SIEVES OF SEW FRAMEWORK TYPE

FIELD

This disclosure relates to the direct synthesis of aluminum-containing forms of SEW framework type molecular sieves via interzeolite transformation.

BACKGROUND

Molecular sieve SSZ-82 is a single crystalline phase material which has a unique two-dimensional 12-/10-ring channel system. The framework structure of SSZ-82 has been assigned the three-letter code SEW by the Structure Commission of the International Zeolite Association.

The composition and characterizing powder X-ray diffraction pattern of SSZ-82 are disclosed in U.S. Pat. No. 7,820,141, which also describes the synthesis of the molecular sieve in the presence of 1,6-bis(N-cyclohexylpyrrolidinium)hexane dications.

SSZ-82 has been conventionally synthesized in its borosilicate form. Borosilicates contain acid sites generally too weak in acid strength to catalyze many hydrocarbon conversion reactions of commercial interest. S. I. Zones et al. (*J. Am. Chem. Soc.* 2014, 136, 1462-1471) describe a method for converting borosilicates, such as SSZ-82, to aluminosilicates with much stronger acid strength.

There remains a need for a method of directly synthesizing SSZ-82 in its aluminosilicate form, thereby eliminating the need for additional modification by post-synthetic aluminum insertion.

According to the present disclosure, it has now been found aluminosilicate SSZ-82 can be directly synthesized by interzeolite transformation (i.e., the transformation of one zeolite structure into another one) from a FAU framework type zeolite.

SUMMARY

In one aspect, there is provided a method of synthesizing a molecular sieve of SEW framework type, the method comprising: (a) preparing a reaction mixture comprising: (1) a FAU framework type zeolite; (2) a source of a Group 1 or Group 2 metal (M); (3) a structure directing agent (Q) comprising 1,6-bis(N-cyclohexylpyrrolidinium)hexane dications; (4) a source of hydroxide ions; (5) water; and (6) seeds of a SEW framework type molecular sieve; and (b) subjecting the reaction mixture to crystallization conditions sufficient to convert the FAU framework type zeolite to a molecular sieve of SEW framework type.

BRIEF DESCRIPTION OF THE DRAWINGS

FIG. 1 shows the powder X-ray diffraction (XRD) patterns of the as-synthesized molecular sieve product of Example 1 (top pattern) and the as-synthesized molecular sieve product of Example 2 (bottom pattern).

DETAILED DESCRIPTION

Definitions

The term "zeolite" means a synthetic aluminosilicate molecular sieve having a framework constructed of alumina and silica (i.e., repeating $SiO_4$ and $AlO_4$ tetrahedral units).

The term "framework type" as used herein has the meaning described in the "*Atlas of Zeolite Framework Types*" by Ch. Baerlocher, L. B. McCusker and D. H. Olson (Elsevier, Sixth Revised Edition, 2007).

The term "as-synthesized" refers to a molecular sieve in its form after crystallization, prior to removal of the structure directing agent.

The term "anhydrous" refers to a molecular sieve substantially devoid of both physically adsorbed and chemically adsorbed water.

As used herein, the numbering scheme for the Periodic Table Groups is as disclosed in *Chem. Eng. News* 1985, 63(5), 26-27.

Synthesis of the Molecular Sieve

A molecular sieve of SEW framework type can be synthesized by: (a) preparing a reaction mixture comprising: (1) a FAU framework type zeolite; (2) a source of a Group 1 or Group 2 metal (M); (3) a structure directing agent (Q) comprising 1,6-bis(N-cyclohexylpyrrolidinium)hexane dications; (4) a source of hydroxide ions; (5) water; and (6) seeds of a SEW framework type molecular sieve; and (b) subjecting the reaction mixture to crystallization conditions sufficient to convert the FAU framework type zeolite to a molecular sieve of SEW framework type.

The reaction mixture can have a composition, in terms of molar ratios, within the ranges set forth in Table 1:

TABLE 1

| Reactants | Useful | Exemplary |
| --- | --- | --- |
| $SiO_2/Al_2O_3$ | 10 to 500 | 30 to 100 |
| $M/SiO_2$ | 0.05 to 0.50 | 0.10 to 0.30 |
| $Q/SiO_2$ | 0.05 to 0.50 | 0.08 to 0.25 |
| $OH/SiO_2$ | 0.05 to 0.50 | 0.15 to 0.30 |
| $H_2O/SiO_2$ | 15 to 80 | 20 to 60 | wherein compositional variables M and Q are as described herein above.

The FAU framework type zeolite can have a silica-to-alumina ratio of 10 to 500. The FAU framework type zeolite can comprise two or more FAU zeolites having different silica-to-alumina ratios. The FAU framework type zeolite can be zeolite Y. The FAU framework type zeolite can be the only silica and aluminum source to form SSZ-82.

The Group 1 or Group 2 metal (M) can be any M-containing compound not detrimental to crystallization process can be used. The Group 1 or Group 2 metal may be sodium or potassium. Sources of the Group 1 or Group 2 metal may include metal hydroxide, metal oxide, metal halide, metal sulfate, metal nitrate, and metal carboxylate. As used here, the phrase "Group 1 or Group 2 metal" does not mean the Group 1 metals and Group 2 metals are used in the alternative, but instead that one or more Group 1 metals can be used alone or in combination with one or more Group 2 metals and that one or more Group 2 metals can be used alone or in combination with one or more Group 1 metals.

The structure directing agent (Q) comprises 1,6-bis(N-cyclohexylpyrrolidinium)hexane dications, represented by the following structure (1):

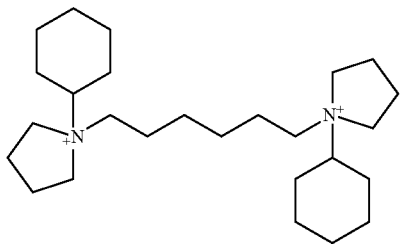

(1)

Suitable sources of Q are the hydroxides and/or other salts of the diquaternary ammonium compound.

The reaction mixture also contains seeds of a SEW framework type molecular sieve, such as SSZ-82. The weight ratio of seeds/SiO$_2$ in the reaction mixture may be in a range of 0.001 to 0.30 (e.g., 0.001 to 0.25, 0.001 to 0.20, 0.001 to 0.15, 0.01 to 0.30, 0.01 to 0.25, 0.01 to 0.20, 0.01 to 0.15, 0.05 to 0.30, 0.05 to 0.25, 0.05 to 0.20, or 0.05 to 0.15). Seeding can be advantageous in decreasing the amount of time necessary for complete crystallization to occur. In addition, seeding can lead to an increased purity of the product obtained by promoting the nucleation and/or formation of SSZ-82 over any undesired phases.

The reaction mixture can be prepared either batch wise or continuously. Crystal size, morphology and crystallization time of the molecular sieve described herein can vary with the nature of the reaction mixture and the crystallization conditions.

Crystallization of the desired molecular sieve from the above reaction mixture can be carried out under either static, tumbled or stirred conditions in a suitable reactor vessel, such as for example polypropylene jars or Teflon-lined or stainless-steel autoclaves, at a temperature of from 125° C. to 200° C. (e.g., 140° C. to 180° C.) for a time sufficient for crystallization to occur at the temperature used, e.g., from about 5 to 50 days. Crystallization is usually conducted under pressure in an autoclave so that the reaction mixture is subject to autogenous pressure.

Once the desired molecular sieve crystals have formed, the solid product can be separated from the reaction mixture by standard mechanical separation techniques such as centrifugation or filtration. The crystals can be water-washed and then dried to obtain the as-synthesized molecular sieve crystals. The drying step can be performed at an elevated temperature (e.g., 75° C. to 150° C.) for several hours (e.g., 4 to 24 hours). The drying step can be performed under vacuum or at atmospheric pressure.

As a result of the crystallization process, the recovered crystalline molecular sieve product contains within its pores at least a portion of the structure directing agent used in the synthesis.

The as-synthesized molecular sieve may be subjected to treatment to remove part or all of the structure directing agent used in its synthesis. Removal of the structure directing agent may be carried out by thermal treatment (e.g., calcination) in which the as-synthesized molecular sieve is heated at a temperature sufficient to remove part or all of the structure directing agent. While sub-atmospheric pressure may be used for the thermal treatment, atmospheric pressure is desired for reasons of convenience. The thermal treatment may be performed at a temperature at least 370° C. for at least a minute and generally not longer than 20 hours (e.g., from 1 to 12 hours). The thermal treatment can be performed at a temperature of up to 925° C. For example, the thermal treatment may be conducted at a temperature of 400° C. to 600° C. in the presence of an oxygen-containing gas for approximately 1 to 8 hours. Additionally or alternatively, the structure directing agent can be removed by treatment with ozone.

Any extra-framework Group 1 and/or Group 2 metal cations in the molecular sieve may be replaced in accordance with techniques well known in the art (e.g., by ion exchange) with other cations. Replacing cations can include metal ions (e.g., rare earth metals and metals of Groups 2 to 15 of the Periodic Table), hydrogen ions, hydrogen precursor ions (e.g., ammonium ions), and combinations thereof.

The present molecular sieve can be formulated into a catalyst composition by combination with other materials, such as binders and/or matrix materials, which provide additional hardness or catalytic activity to the finished catalyst. When blended with such components, the relative proportions of the present molecular sieve and matrix may vary widely with the content of the present molecular sieve ranging from 1 to 90 wt. % (e.g., from 2 to 80 wt. %) of the total catalyst.

Characterization of the Molecular Sieve

In its as-synthesized and anhydrous form, the present molecular sieve herein can have a chemical composition comprising the following molar relationship with the ranges set forth in Table 2:

TABLE 2

| | Broad | Exemplary |
|---|---|---|
| SiO$_2$/Al$_2$O$_3$ | 10 to 500 | 30 to 100 |
| Q/SiO$_2$ | >0 to 0.1 | >0 to 0.1 |
| M/SiO$_2$ | >0 to 0.1 | >0 to 0.1 | wherein Q comprises 1,6-bis(N-cyclohexylpyrrolidinium) hexane dications; and M is a Group 1 or Group 2 metal.

Powder XRD patterns representative of SSZ-82 can be referenced in U.S. Pat. No. 7,820,141. The powder XRD patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

EXAMPLES

The following illustrative examples are intended to be non-limiting.

Example 1

The following components were added, in order, to a Teflon liner: 22.96 g of deionized water, 2.64 g of a 1 M NaOH solution, 4.38 g of a 12.6% 1,6-bis(N-cyclohexylpyrrolidinium)hexane hydroxide solution, 0.8 g of CBV 720 Y-zeolite powder (Zeolyst International; SiO$_2$/Al$_2$O$_3$ molar ratio=30), and 0.08 g of SSZ-82 seeds. The composition of the reaction mixture, in terms of molar ratios was as follows:

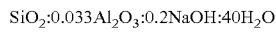

SiO$_2$:0.033Al$_2$O$_3$:0.2NaOH:40H$_2$O

The liner was then capped and sealed within a Parr steel autoclave reactor. The autoclave was then placed an oven and heated at 160° C. for 35 days with tumbling at 43 rpm. The solid products were recovered from the cooled reactor by centrifugation, washed with deionized water and dried at 95° C.

The powder XRD pattern of the resulting product is provided in FIG. 1 (top pattern) and is consistent with the product being pure SSZ-82 molecular sieve.

The product had a SiO$_2$/Al$_2$O$_3$ molar ratio of 32, as determined by Inductively Coupled Plasma (ICP) elemental analysis.

Example 2

Example 1 was repeated except that CBV 760 Y-zeolite powder (Zeolyst International; SiO$_2$/Al$_2$O$_3$ molar ratio=60) was used instead of CBV 720 Y-zeolite powder. The composition of the reaction mixture, in terms of molar ratios, was as follows:

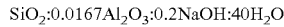

SiO$_2$:0.0167Al$_2$O$_3$:0.2NaOH:40H$_2$O

The reaction mixture contained seeds of SSZ-82 in a weight ratio of seeds/SiO$_2$ of 0.1. The liner was then capped and sealed within a Parr steel autoclave reactor. The autoclave was then placed an oven and heated at 160° C. for 7 days with tumbling at 43 rpm. The solid products were recovered from the cooled reactor by centrifugation, washed with deionized water and dried at 95° C.

The powder XRD pattern of the resulting product is provided in FIG. 1 (bottom pattern) and is consistent with the product being pure SSZ-82 molecular sieve.

The product had a SiO$_2$/Al$_2$O$_3$ molar ratio of 48, as determined by ICP elemental analysis.

Example 3 (Comparative)

Example 1 repeated except that no seeds were added to the reaction mixture.

The product was analyzed by powder XRD and shown to be a phase other than SSZ-82.

Example 4 (Comparative)

Example 2 repeated except that no seeds were added to the reaction mixture.

The product was analyzed by powder XRD and shown to be a phase other than SSZ-82.

Example 5

The as-synthesized molecular sieve product from Example 1 was calcined inside a muffle furnace under a flow of air heated to 550° C. at a rate of 1° C./minute and held at 550° C. for 5 hours and cooled.

Analysis by the t-plot method of nitrogen physisorption showed the sample had an external surface area of 63.05 m$^2$/g, a micropore volume of 0.1900 cm$^3$/g, and a total pore volume of 0.2725 cm$^3$/g. Analysis by temperature-programmed desorption of isopropylamine showed that the sample had an acid site density of 739 μmol/g.

Example 6

The as-synthesized molecular sieve product from Example 2 was calcined inside a muffle furnace under a flow of air heated to 550° C. at a rate of 1° C./minute and held at 550° C. for 5 hours and cooled.

Analysis by the t-plot method of nitrogen physisorption showed the sample had an external surface area of 33.94 m$^2$/g, a micropore volume of 0.2074 cm$^3$/g, and a total pore volume of 0.4063 cm$^3$/g. Analysis by temperature-programmed desorption of isopropylamine showed that the sample had an acid site density of 536 μmol/g.

The invention claimed is:

1. A method of synthesizing a molecular sieve of SEW framework type, the method comprising:
   (a) preparing a reaction mixture comprising:
      (1) a FAU framework type zeolite having;
      (2) a source of a Group 1 or Group 2 metal (M);
      (3) a structure directing agent (Q) comprising 1,6-bis (N-cyclohexylpyrrolidinium)hexane dications;
      (4) a source of hydroxide ions;
      (5) water; and
      (6) seeds of a SEW framework type molecular sieve; and
   (b) subjecting the reaction mixture to crystallization conditions sufficient to convert the FAU framework type zeolite to a molecular sieve of SEW framework type;
   wherein the FAU framework type zeolite is the only silica and aluminum source in the reaction mixture.

2. The method of claim 1, wherein the reaction mixture has a composition, in terms of molar ratios, as follows:

| | |
|---|---|
| SiO$_2$/Al$_2$O$_3$ | 10 to 500 |
| M/SiO$_2$ | 0.05 to 0.50 |
| Q/SiO$_2$ | 0.05 to 0.50 |
| OH/SiO$_2$ | 0.05 to 0.50 |
| H$_2$O/SiO$_2$ | 15 to 80. |

3. The method of claim 1, wherein the reaction mixture has a composition, in terms of molar ratios, as follows:

| | |
|---|---|
| SiO$_2$/Al$_2$O$_3$ | 30 to 100 |
| M/SiO$_2$ | 0.10 to 0.30 |
| Q/SiO$_2$ | 0.08 to 0.25 |
| OH/SiO$_2$ | 0.15 to 0.30 |
| H$_2$O/SiO$_2$ | 20 to 60. |

4. The method of claim 1, wherein the FAU framework type zeolite comprises zeolite Y.

5. The method of claim 1, wherein the Group 1 or Group 2 metal comprises sodium.

6. The method of claim 1, wherein seeds are present in an amount such that a weight ratio of seeds/SiO$_2$ in the reaction mixture is in a range of 0.001 to 0.3.

7. The method of claim 1, wherein seeds are present in an amount such that a weight ratio of seeds/SiO$_2$ in the reaction mixture is in a range of 0.05 to 0.2.

8. The method of claim 1, wherein the crystallization conditions include a temperature of from 125° C. to 200° C.

9. The method of claim 1, wherein the molecular sieve of SEW framework type is SSZ-82.

* * * * *